H. W. NEAL.
DUMPING WAGON.
APPLICATION FILED APR. 10, 1908.

908,417.

Patented Dec. 29, 1908.

Witnesses
Frank A. Fahle
Thomas W. McMeans

Inventor
Harry W. Neal,
By Bradford Hood
Attorneys

UNITED STATES PATENT OFFICE.

HARRY W. NEAL, OF INDIANAPOLIS, INDIANA, ASSIGNOR OF ONE-HALF TO EVINGTON E. DAVIS, OF INDIANAPOLIS, INDIANA.

DUMPING-WAGON.

No. 908,417.   Specification of Letters Patent.   Patented Dec. 29, 1908.

Application filed April 10, 1908. Serial No. 426,200.

*To all whom it may concern:*

Be it known that I, HARRY W. NEAL, a citizen of the United States, residing at Indianapolis, in the county of Marion and State of Indiana, have invented certain new and useful Improvements in Dumping-Wagons, of which the following is a specification.

The object of my invention is to provide an efficient but cheap dumping wagon applicable to any ordinary running gear wherein the load supporting parts are so arranged that when in dumping position a very wide discharge throat will be formed having steeply inclined parts down which the load will quickly slide.

The accompanying drawings illustrate my invention.

Figure 1:
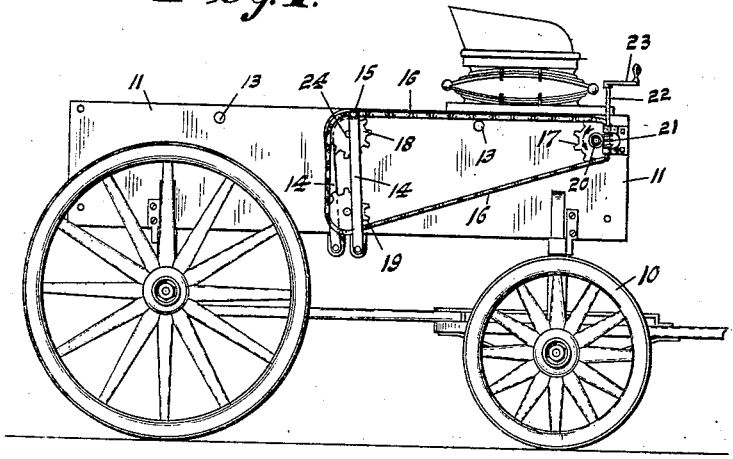
Figure 2:
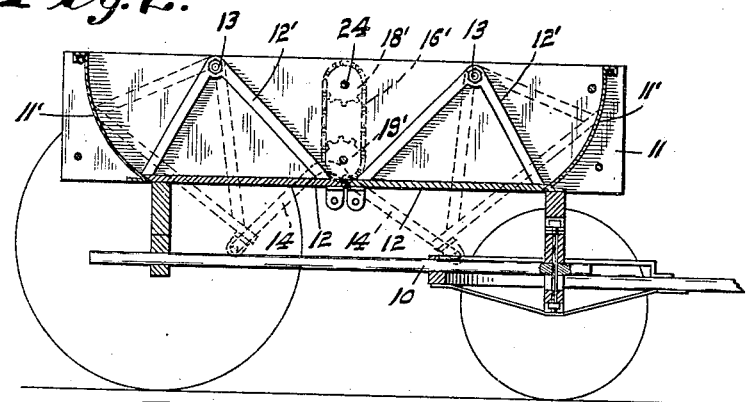
Figure 3:
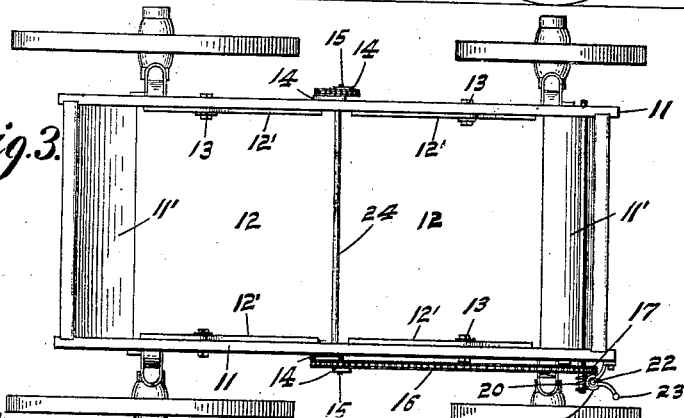

Figure 1 is a side elevation of a wagon constructed in accordance with my invention; Fig. 2 a longitudinal section; and Fig. 3 a plan.

In the drawings 10 indicates any suitable running gear and 11 a box bed. The bottom of bed 11 is formed by means of two swinging plates 12 12 each of which is provided immediately adjacent the sides of bed 11 with hanger members 12' 12' which extend upward to about the top of the bed and are there supported upon pivot pins 13 13 said pivot pins being preferably located closer to the outer ends of the plates than to their adjacent ends. In order to support the plates 12 12 I provide at each side of the wagon bed a pair of links 14 14 the upper ends of which are connected to pins 15 carried by a chain suitably mounted on the wagon bed, the lower ends of said links being connected to the adjacent ends of the plates 12. On one side of the wagon the chain 16 passes around a sprocket wheel 17 mounted near the front of the wagon bed and around a pair of wheels 18 and 19 journaled upon the side of the wagon bed the said wheel 18 being substantially vertical above the wheel 19. Wheel 17 is provided with a spiral gear 20 meshing with a spiral gear 21 carried by an operating shaft 22 journaled on the body 11 and extended up to the point where its operating crank 23 may be readily reached from the driver's seat. On the opposite side of the wagon bed I provide a pair of gears 18' and 19' (see dotted lines in Fig. 2) which are connected by a chain 16' to which the links 14 14 on that side of the wagon are connected. Sprocket wheel 18' is connected to a shaft 24 to which sprocket wheel 18 is also connected. The end boards 11' of the wagon bed are substantially concentric with the pins 13 so as to fit the outer ends of the plates 12 as they swing upwardly to discharging position, as indicated in dotted lines in Fig. 2.

In operation a rotation of gear 17 in the direction indicated by the arrow will cause the pins 15 to move with their chains downward from wheels 18 and 18' toward wheels 19 and 19' respectively thus causing the plates 12 to swing downwardly and away from each other. The position of the pivots 13 as shown also insures a wide discharge throat between the adjacent ends of plates 12 when said plates are thrown in discharging position.

I claim as my invention:

A dumping wagon comprising a main box bed, a pair of plates forming a bottom therefor, hangers for said plates extending therefrom at the sides of the bed, pivotal supports for said hangers on the bed at points materially above the plates, a pair of plate-supporting links connected to the ends of said plates, and an endless carrier mounted upon suitable supports on the body with a portion extending substantially vertically, the said supports for said endless carrier, a connection between said carrier and the plate-supporting links, and means for shifting said carrier, substantially as and for the purpose set forth.

In witness whereof, I have hereunto set my hand and seal at Indianapolis, Indiana, this sixth day of April, A. D. one thousand nine hundred and eight.

HARRY W. NEAL. [L. S.]

Witnesses:
ARTHUR M. HOOD,
THOMAS W. MCMEANS.